(12) United States Patent  
Igata (10) Patent No.: US 9,300,362 B2  
(45) Date of Patent: Mar. 29, 2016

(54) POWER SUPPLY APPARATUS AND VEHICLE CHARGING APPARATUS

(75) Inventor: Yuji Igata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 653 days.

(21) Appl. No.: 13/546,707

(22) Filed: Jul. 11, 2012

(65) Prior Publication Data

US 2012/0274278 A1 Nov. 1, 2012

Related U.S. Application Data

(63) Continuation-in-part of application No. PCT/JP2011/000095, filed on Jan. 12, 2011.

(30) Foreign Application Priority Data

Jan. 13, 2010 (JP) ................................. 2010-004720

(51) Int. Cl.
*B60L 11/18* (2006.01)
*H04B 3/54* (2006.01)

(52) U.S. Cl.
CPC ............. *H04B 3/542* (2013.01); *B60L 11/1846* (2013.01); *H04B 3/54* (2013.01); *H04B 2203/5445* (2013.01); *H04B 2203/5458* (2013.01); *H04B 2203/5483* (2013.01); *Y02T 90/14* (2013.01)

(58) Field of Classification Search
CPC ................................ H04B 3/54; H04B 1/1018
USPC .................................... 320/108; 340/531, 533
See application file for complete search history.

(56) References Cited

U.S. PATENT DOCUMENTS

| 4,475,209 A | 10/1984 | Udren |
| 8,154,150 B2 | 4/2012 | Sakai et al. |
| 8,415,918 B2 * | 4/2013 | Tonegawa ..................... 320/109 |
| 2001/0045888 A1 | 11/2001 | Kline |

(Continued)

FOREIGN PATENT DOCUMENTS

| CN | 1564475 A | 1/2005 |
| CN | 101909927 | 12/2010 |

(Continued)

OTHER PUBLICATIONS

International Search Report dated Apr. 19, 2011.

(Continued)

*Primary Examiner* — Arun Williams
*Assistant Examiner* — Gardy J Lacombe
(74) *Attorney, Agent, or Firm* — Seed IP Law Group PLLC (57) ABSTRACT

A low-pass filter (63) is disposed between a residential power line (3a) and a vehicle power line (7), and attenuates a power line communication high-frequency signal. A power line communication section (60) is connected in parallel to the low-pass filter (63), performs conversion to a signal of a frequency lower than that of a power line communication high-frequency signal superimposed on the residential power line (3a) from a charge command apparatus, and communicates with a vehicle via the vehicle power line (7) by means of the converted low-frequency signal. A control section (65) controls connection or disconnection of a connection section (64) based on a charge command apparatus command signal demodulated by the power line communication section (60).

19 Claims, 8 Drawing Sheets

(56) References Cited

U.S. PATENT DOCUMENTS

| | | |
|---|---|---|
| 2004/0153543 A1 | 8/2004 | Thomas |
| 2008/0224536 A1* | 9/2008 | Yamazaki ........................ 307/1 |
| 2009/0302801 A1 | 12/2009 | Katsunaga |
| 2010/0111201 A1 | 5/2010 | Sakai et al. |
| 2011/0022222 A1 | 1/2011 | Tonegawa |

FOREIGN PATENT DOCUMENTS

| | | | |
|---|---|---|---|
| EP | 1 995 109 A1 | 11/2008 | |
| JP | 58-191536 | 11/1983 | |
| JP | 2003-521147 | 7/2003 | |
| JP | 2004222176 A * | 8/2004 | .............. H04B 3/54 |
| JP | 2009-171700 | 7/2009 | |
| WO | 01/54297 | 7/2001 | |
| WO | 2008/123182 A1 | 10/2008 | |
| WO | 2009-090813 | 7/2009 | |

OTHER PUBLICATIONS

English Translation of Chinese Search Report dated Apr. 21, 2014, for Corresponding CN Patent Application No. 201180005886.3, 2 pages.

Extended European Search Report dated Sep. 8, 2015, for corresponding EP Application No. 11732774.2-1852/2525466, 7 pages.

* cited by examiner

POWER SUPPLY APPARATUS AND VEHICLE CHARGING APPARATUS

CROSS REFERENCE TO RELATED APPLICATIONS

This application is a continuation (in-part) of International Patent Application No. PCT/JP2011/000095, filed on Jan. 12, 2011, the disclosure of which is incorporated herein by reference in its entirety. International Patent Application No. PCT/JP2011/000095 is entitled to (or claims) the benefit of Japanese Patent Application No. 2010-004720, filed on Jan. 13, 2010, the disclosure of which is incorporated herein by reference in its entirety.

TECHNICAL FIELD

The present invention relates to a power supply apparatus that supplies power to a vehicle that incorporates an electrical storage apparatus and a motor that rotates the wheels, and drives the motor using power of the electrical storage apparatus, and a vehicle charging system that uses this.

RELATED ART

In recent years, attention has continued to been drawn to an electric vehicle that incorporates an electrical storage apparatus and a motor that rotates the wheels, and drives the motor using power of the electrical storage apparatus, as an environment-friendly vehicle. With a vehicle of this kind, power is supplied to a power line from a vehicle charging apparatus outside the body of the vehicle, and the supplied power is stored in the electrical storage apparatus (see Patent Literature 1, for example).

RELATED ART LIST

Patent Literature

PTL 1
Japanese Patent Application Laid-Open No. 2009-171700

SUMMARY OF INVENTION

In the case of a typical residence, a vehicle charging apparatus is connected to a power line of a power source inside the residence, and charging power is supplied to a vehicle using power of the power source inside the residence.

However, a problem is that, when a charge command apparatus inside a residence superimposes a high-frequency signal on a power line and performs power line communication with a vehicle via a vehicle charging apparatus, a power line communication high-frequency signal output from the charge command apparatus is prone to leak outside the residence via the power line.

There is thus a demand for leakage of a power line communication high-frequency signal outside a residence to be impeded even when a charge command apparatus inside the residence performs power line communication with a vehicle via a vehicle charging apparatus.

Consequently, the power supply apparatus described below performs supplying of power to a device having a second power line communication apparatus that performs communication with a first power line communication apparatus via a power line, and employs a configuration having: a receiving section that receives a first signal that is transmitted from the first power line communication apparatus and has a first frequency via the power line; a frequency conversion section that converts the first signal to a second signal having a second frequency lower than the first frequency; and a transmitting section that transmits the second signal to the second power line communication apparatus via the power line.

EMBODIMENT

Now, an embodiment will be described in detail with reference to the accompanying drawings. In the drawings, identical or equivalent parts are assigned the same reference codes.

First, a vehicle charging system according to an embodiment of the present invention will be described with reference to FIG. 1 through FIG. 8. Here, a case is described by way of example in which an electric vehicle incorporates an electrical storage apparatus and a motor that rotates the wheels, and drives the motor using power stored in the electrical storage apparatus. With an electric vehicle, power stored in the electrical storage apparatus is supplied to the motor and the wheels are rotated by the motor, enabling the vehicle to move to another place.

Figure 1:
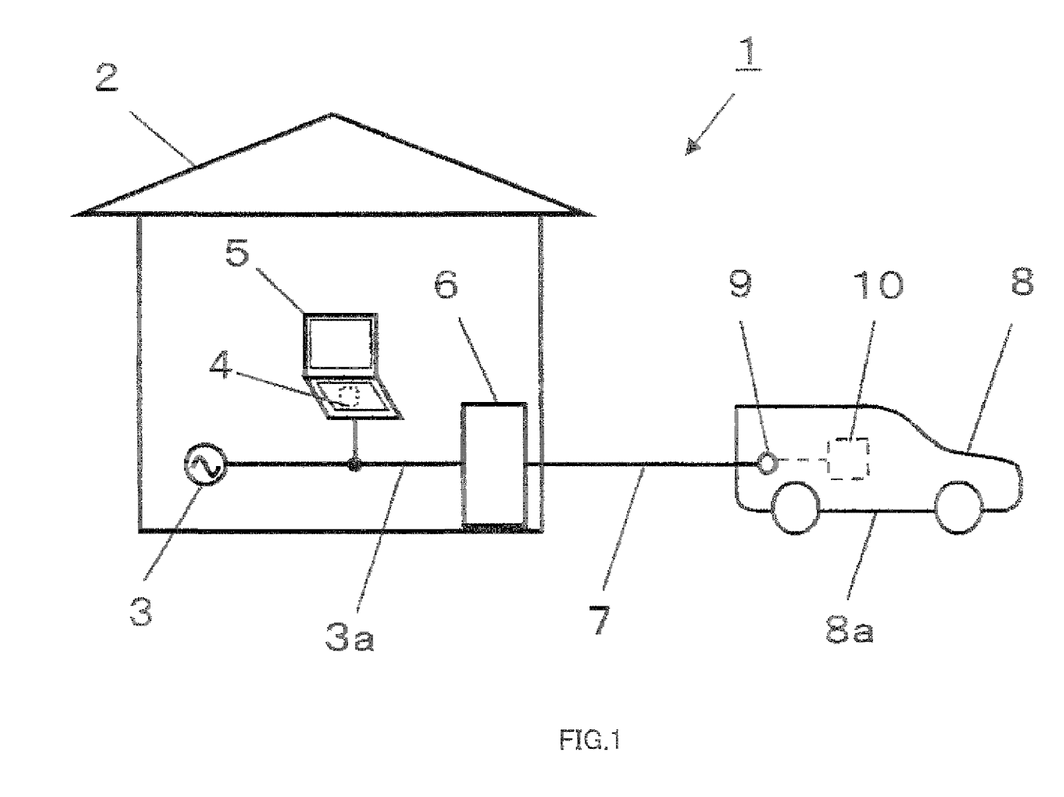
FIG. 1 is a configuration diagram of a vehicle charging system according to an embodiment.

FIG. 1 is a configuration diagram of vehicle charging system 1 according to this embodiment. In FIG. 1, vehicle charging system 1 is provided with charge command apparatus 5 incorporated in power line communication section 4, vehicle charging apparatus 6, and vehicle 8 connected to vehicle charging apparatus 6 via vehicle power line 7.

In typical residence 2, charge command apparatus 5 and vehicle charging apparatus 6 are connected to power source 3 of residence 2. By this means, necessary power is supplied to vehicle charging apparatus 6 from power source 3 of residence 2. Vehicle charging apparatus 6 supplies power to vehicle 8 using power of power source 3 of residence 2.

In vehicle charging system 1, after vehicle power line 7 is inserted in power socket 9 of vehicle 8, vehicle 8 authentication is performed by charge command apparatus 5, and power is supplied to vehicle 8 only if authentication is successful. Vehicle 8 charges electrical storage apparatus 10 installed in vehicle body 8a with power supplied via power socket 9.

Charge command apparatus 5 is configured as a dedicated device. A personal computer may also be used instead of a dedicated device. Via built-in power line communication section 4, charge command apparatus 5 uses the power source 3 power line to perform power line communication with vehicle charging apparatus 6.

Vehicle charging apparatus 6 is connected to residential power line 3a of power source 3 inside residence 2, and supplies charging power to vehicle 8 using power of power source 3 inside residence 2.

However, since power line communication is performed with vehicle 8 via vehicle charging apparatus 6 with a high-frequency signal superimposed on residential power line 3a by charge command apparatus 5 inside residence 2, a high-frequency signal of power line communication performed via residential power line 3a inside residence 2 is prone to leakage outside residence 2. A frequency of 2 MHz to 30 MHz, for example, is used as the frequency of a signal used in power line communication, and high-speed communication can be performed by means of such a high-frequency signal.

Figure 2:
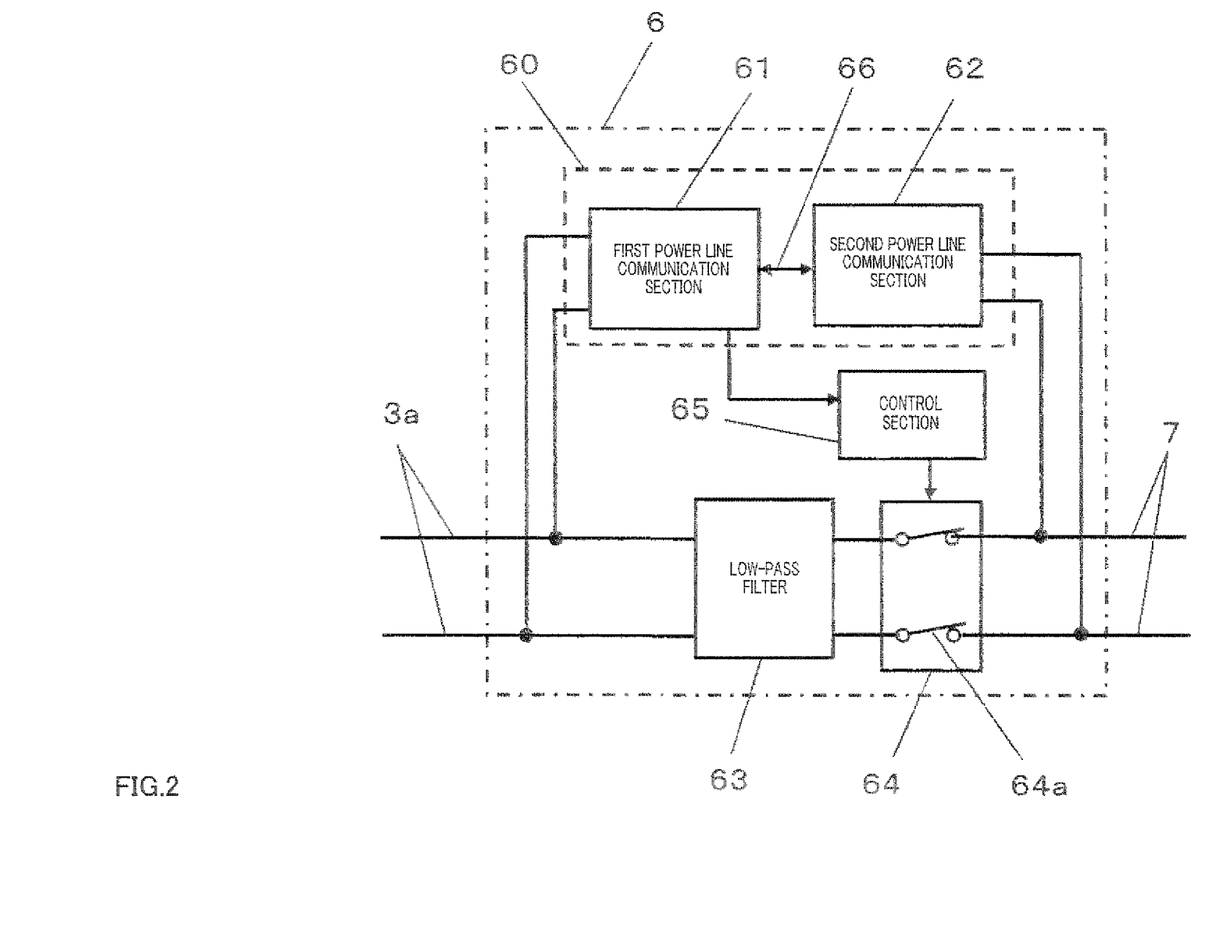
FIG. 2 is a block diagram showing the configuration of a vehicle charging apparatus of a vehicle charging system.

Thus, in this embodiment, leakage of a power line communication high-frequency signal outside residence 2 is impeded by means of the configuration of vehicle charging apparatus 6 shown in FIG. 2 even when charge command apparatus 5 inside residence 2 performs power line communication with vehicle 8 via vehicle charging apparatus 6.

Vehicle charging apparatus 6 is not limited to charging a hybrid vehicle or electric vehicle, and may also charge a motorcycle or car with a built-in battery, or an actual electrical device or battery that requires charging.

Also, a power line communication high-frequency signal transmitted by charge command apparatus 5 is authentication information used to perform authentication for vehicle 8 or control. information for controlling vehicle charging performed by vehicle charging apparatus 6.

Specifically, authentication information is address information (a MAC address or the like) held by power line communication section 4.

Also, specifically, control information is a charge command signal transmitted to control section 65 described later herein or a confirmation signal for confirming the charge status of vehicle 8.

FIG. 2 is a block diagram showing the configuration of vehicle charging apparatus 6 of vehicle charging system 1 according to this embodiment.

That is to say, vehicle charging apparatus 6 is disposed between residential power line 3a and vehicle power line 7, and is provided with low-pass filter 63 that attenuates a power line communication high-frequency signal, power line communication section 60 that is connected in parallel to low-pass filter 63, performs conversion to a signal of a frequency lower than that of a power line communication high-frequency signal superimposed on residential power line 3a from charge command apparatus 5 (FIG. 1), and communicates with vehicle 8 (FIG. 1) via vehicle power line 7 by means of the converted low-frequency signal, and control section 65 that controls connection or disconnection of connection section 64 based on a charge command apparatus 5 command signal demodulated by power line communication section 60.

Power line communication section 60 is disposed on a bypass path that bypasses low-pass filter 63 and connection section 64.

By means of this configuration, vehicle charging apparatus 6 outputs a power line communication high-frequency signal output from charge command apparatus 5 and superimposed on residential power line 3a to vehicle power line 7 after being attenuated by low-pass filter 63, enabling power line communication high-frequency signal leakage outside residence 2 to be impeded. Also, since power line communication section 60 performs conversion to a signal of a frequency lower than that of a power line communication high-frequency signal used inside residence 2 and communicates with vehicle 8 outside residence 2, leakage outside residence 2 of a power line communication signal used inside residence 2 can be impeded.

Charge command apparatus 5 can control a vehicle charging apparatus 6 charging operation, and perform authentication by means of communication with vehicle 8 via vehicle charging apparatus 6. By this means, vehicle charging apparatus 6 can supply power to vehicle 8 via vehicle power line 7 based on a charge command apparatus 5 command. Specifically, charge command apparatus 5 issues a charging permission command to control section 65 of vehicle charging apparatus 6 only for a vehicle 8 for which authentication has been completed, and sends a charging non-permission command for an irregular vehicle 8 that has not been authenticated.

Power line communication section 60 has first power line communication section 61 and second power line communication section 62, and first power line communication section 61 and second power line communication section 62 are connected via dedicated data line 66. First power line communication section 61 demodulates a power line communication high-frequency signal superimposed on residential power line 3a from charge command apparatus 5, and outputs this signal to dedicated data line 66.

Connection section 64 comprises switch 64a, and performs connection or disconnection between residential power line 3a and vehicle power line 7 according to whether it is in a closed state or in an open state.

Control section 65 receives a charge command apparatus 5 command signal demodulated by first power line communication section 61. Then control section 65 controls switch 64a of connection section 64 so as to be in a closed state (on state) when a received command signal is a charging permission signal, and to be in an open state (off state) when a received command signal is a charging non-permission signal. By this means, it is possible for vehicle charging system 1 not to supply power to an irregular vehicle 8, enabling electricity theft to be prevented.

First power line communication section 61 demodulates a command signal from charge command apparatus 5 and outputs this signal to dedicated data line 66, and, as described later herein, second power line communication section 62 modulates dedicated data line 66 data with a signal of a frequency (for example, a frequency of 10 kHz to 450 kHz) lower than that of a power line communication high-frequency signal (a signal with a frequency of 2 MHz to 30 MHz), and outputs this signal to vehicle power line 7. By this means, leakage of a power line communication high-frequency signal used inside residence 2 into space outside residence 2 via vehicle power line 7 can be suppressed, since radiation tends to be suppressed in the case of a low-frequency signal.

Generally, power line noise in a high-frequency signal frequency band of 2 to 30 MHz is lower than power line noise in a low-frequency signal frequency band of 10 kHz to 450 kHz, and therefore a high-frequency signal transmission speed is higher than a low-frequency signal transmission speed.

Also, control section 65 performs control based on a charge command apparatus 5 command signal demodulated by first power line communication section 61.

It is also possible for a charge command apparatus 5 command signal to be output from second power line communication section 62. If a command signal is output from second power line communication section 62, the command signal frequency falls, enabling radiation to be more easily suppressed, and signal leakage to vehicle power line 7 or the like via a control circuit to be suppressed.

If charge command apparatus 5 is a generally used personal computer or the like, it may be possible to perform communication with a power line communication apparatus other than vehicle charging apparatus 6. In this case, when charge command apparatus 5 or that power line communication apparatus transmits a broadcast signal or multicast signal to residential power line 3a, vehicle charging apparatus 6 also receives that broadcast signal or that multicast signal. However, if that broadcast signal or that multicast signal is not a signal addressed to vehicle charging apparatus 6, when that signal is passed from first power line communication section 61 to second power line communication section 62, a problem arises of second power line communication section 62 communication being slowed down because the band used for communication by second power line communication section 62 is smaller than the band used by first power line communication section 61. Thus, first power line communication section 61 analyzes the destination of a received broadcast signal or multicast signal, and does not transmit that signal to second power line communication section 62 if that destination is not vehicle charging apparatus 6. Analysis of the destination of a received broadcast signal or multicast signal is performed by first signal processing section 14 described later herein. If the destination of a received signal is not vehicle charging apparatus 6, first signal processing section 14 does not pass that signal to first dedicated communication section 15 (that is, does not pass that signal to second power line communication section 62). Therefore, that broadcast signal or that multicast signal is not converted to a power line communication low-frequency signal.

Similarly, if the destination of a broadcast signal or multicast signal transmitted by charge command apparatus 5 or that power line communication apparatus is not second power line communication section 62, first signal processing section 14 does not pass that signal to second power line communication section 62, and therefore that broadcast signal or that multicast signal is not converted to a power line communication low-frequency signal.

Even when connection section 64 is in an open state, since power line communication section 60 is connected in parallel to low-pass filter 63, charge command apparatus 5 can communicate with vehicle 8 via vehicle charging apparatus 6, and can perform vehicle 8 authentication.

Also, although low-pass filter 63 is here disposed between residential power line 3a and connection section 64, low-pass filter 63 may also be disposed between connection section 64 and vehicle power line 7. With this configuration, also, leakage via vehicle power line 7 into space outside residence 2 of a power line communication signal used inside residence 2 can be suppressed.

Figure 3:
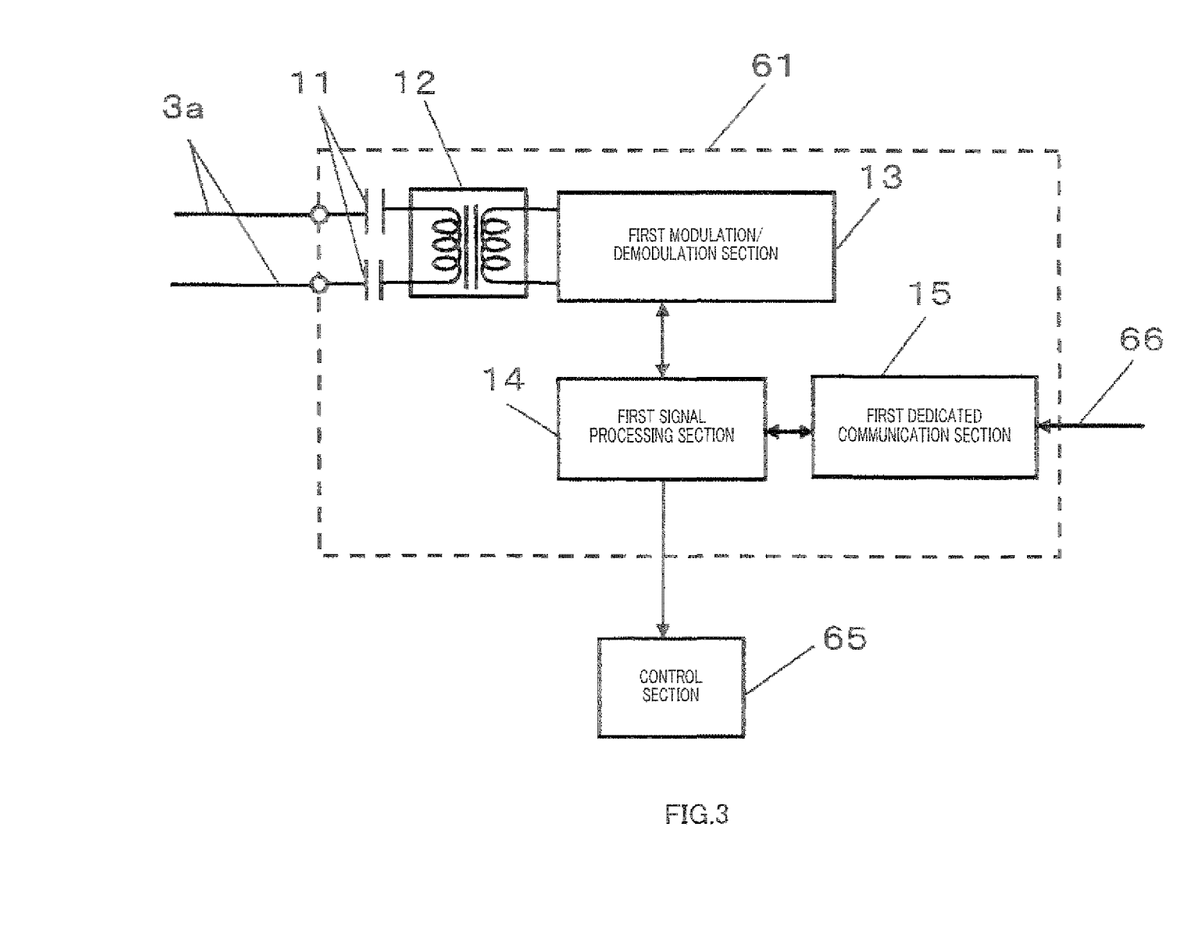
FIG. 3 is a block diagram showing the configuration of a first power line communication section of a vehicle charging apparatus in a vehicle charging system.

Next, actual configurations of first power line communication section 61 and second power line communication section 62 of power line communication section 60 in vehicle charging apparatus 6 will be described with reference to FIG. 3 and FIG. 4. FIG. 3 is a block diagram showing the configuration of first power line communication section 61 of vehicle charging apparatus 6 according to this embodiment, and FIG. 4 is a block diagram showing the configuration of second power line communication section 62 of vehicle charging apparatus 6 according to this embodiment.

As shown in FIG. 3, first power line communication section 61 has first coupler 12 connected to a residential power line 3a pair via capacitors 11, first modulation/demodulation section 13 that is connected to first coupler 12 and modulates or demodulates a signal, first signal processing section 14 that decodes a signal demodulated by first modulation/demodulation section 13, and first dedicated communication section 15 that is connected between first signal processing section 14 and dedicated data line 66 and transfers communication information decoded by first signal processing section 14 via dedicated data line 66. Also, first signal processing section 14 is connected to control section 65.

Figure 4:
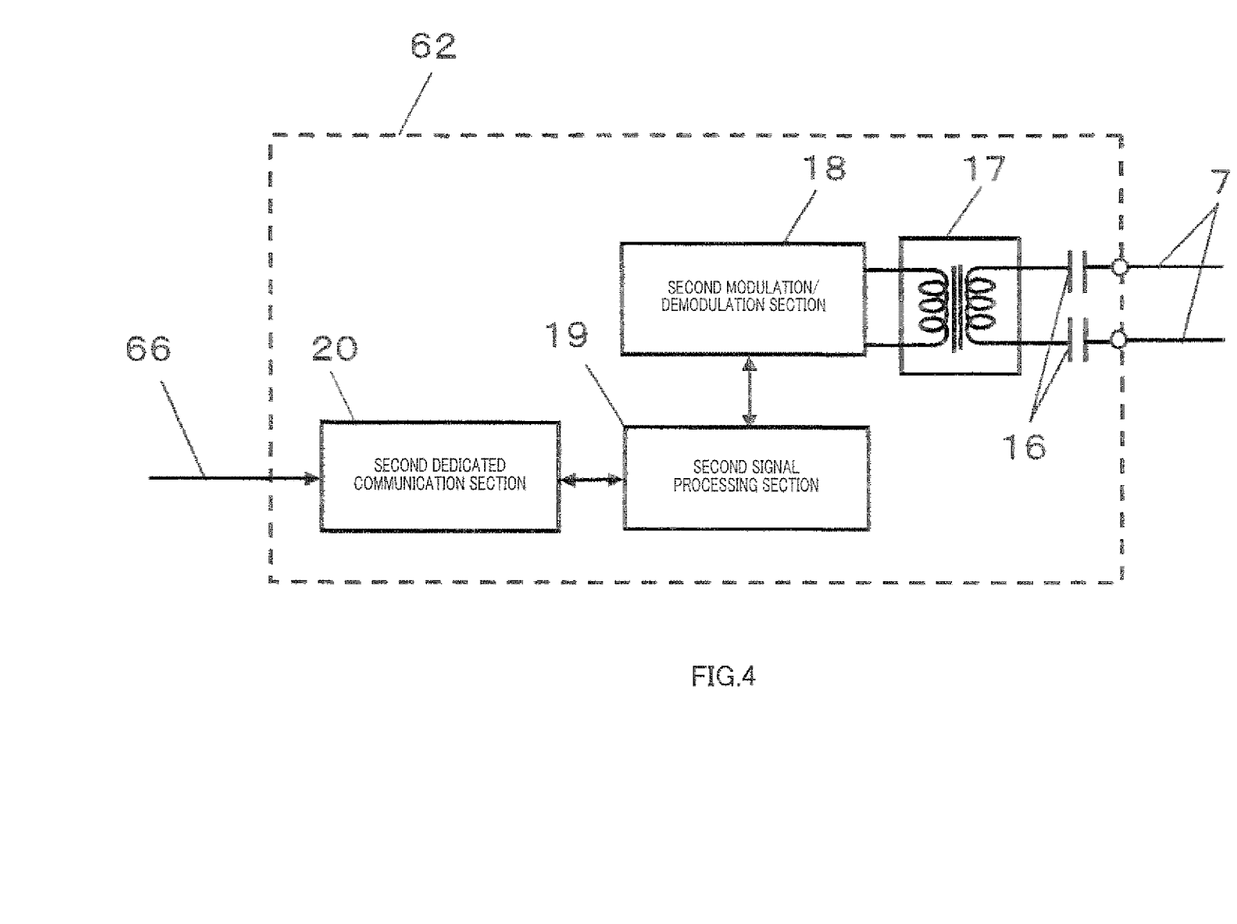
FIG. 4 is a block diagram showing the configuration of a second power line communication section of a vehicle charging apparatus in a vehicle charging system.

As shown in FIG. 4, second power line communication section 62 has second coupler 17 connected to a vehicle power line 7 pair via capacitors 16, second modulation/demodulation section 18 that is connected to second coupler 17 and modulates or demodulates a signal, second signal processing section 19 that decodes a signal demodulated by second modulation/demodulation section 18, and second dedicated communication section 20 that is connected between second signal processing section 19 and dedicated data line 66 and transfers communication information decoded by second signal processing section 19 via dedicated data line 66.

First dedicated communication section 15 performs communication with second dedicated communication section 20 via Ethernet (registered trademark), fiber optic, or suchlike dedicated data line 66.

First modulation/demodulation section 13 and second modulation/demodulation section 18 demodulate a communication signal superimposed on a power line (residential power line 3a or vehicle power line 7) and recover data, and also modulate data into a signal to be superimposed on a power line. First signal processing section 14 decomposes self-addressed necessary data from the data and sends this to control section 65, and also adds destination information and/or an error correction code to data sent from charge command apparatus 5 or electrical storage apparatus 10 and sends this data to first modulation/demodulation section 13 or second modulation/demodulation section 18.

Transformers are used as first coupler 12 and second coupler 17. First dedicated communication section 15 outputs data (communication information) from first signal processing section 14 to dedicated data line 66. Similarly, second dedicated communication section 20 outputs data (communication information) from second signal processing section 19 to dedicated data line 66. If Ethernet (registered trademark)) is used as dedicated data line 66, first dedicated communication section 15 and second dedicated communication section 20 convert data to an Ethernet (registered trademark) signal and output that signal.

In this embodiment, first power line communication section 61 and second power line communication section 62 perform communication operations at independent dedicated frequencies.

Specifically, first modulation/demodulation section 13 and second modulation/demodulation section 18 perform power line communication at different frequencies. Second modulation/demodulation section 18 uses a frequency (for example, a frequency of 10 kHz to 450 kHz) lower than a frequency (for example, a frequency of 2 MHz to 30 MHz) used by first modulation/demodulation section 13 to communicate with a device inside residence 2 as a frequency when performing power line communication. Performing communication after conversion to a signal of a frequency lower than that of a power line communication high-frequency signal superimposed on residential power line 3a makes radio wave leakage from vehicle power line 7 easier to suppress, and enables leakage of a power line communication signal into space outside residence 2 to be impeded.

Thus, a power line communication high-frequency signal superimposed on residential power line 3a from charge command apparatus 5 is converted to a signal of a frequency lower than the frequency (for example, a frequency of 2 MHz to 30 MHz) used by first power line communication section 61 and second power line communication section 62 to communicate with a device inside residence 2, and is communicated to vehicle 8 outside residence 2 via vehicle power line 7. On the other hand, a low-frequency signal transmitted from vehicle 8 is superimposed on residential power line 3a as a high-frequency signal of a frequency (for example, a frequency of 2 MHz to 30 MHz) used to communicate with a device inside residence 2 via second power line communication section 62 and first power line communication section 61, and is transmitted to charge command apparatus 5.

By this means, leakage of a power line communication signal into space outside residence 2 can be impeded even when charge command apparatus 5 inside residence 2 performs power line communication with vehicle 8 via vehicle charging apparatus 6.

In the above embodiment, an example has been described in which first modulation/demodulation section 13 and second modulation/demodulation section 18 are both disposed on a bypass path, but the same technological effect can also be achieved if at least one of first modulation/demodulation section 13 and second modulation/demodulation section 18 is disposed on a bypass path. That is to say, it is possible for a power line communication high-frequency signal transmitted from charge command apparatus 5 to be transmitted to the vehicle 8 side.

Next, actual configurations of low-pass filter 63 in vehicle charging apparatus 6 will be described with reference to FIG. 5 through FIG. 7.

Figure 5:
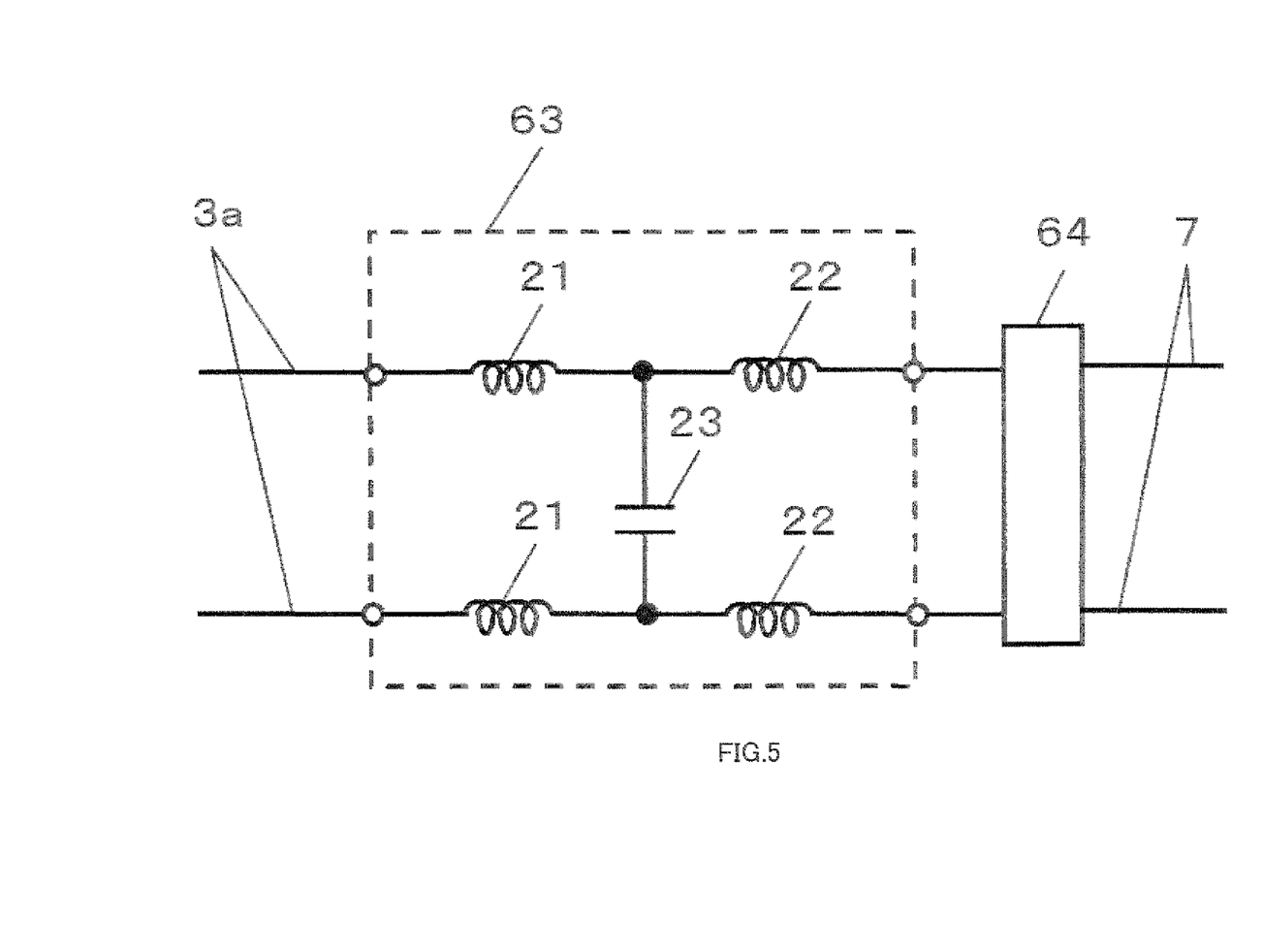
FIG. 5 is a block diagram showing a configuration of a low-pass filter of a vehicle charging apparatus in a vehicle charging system.
Figure 6:
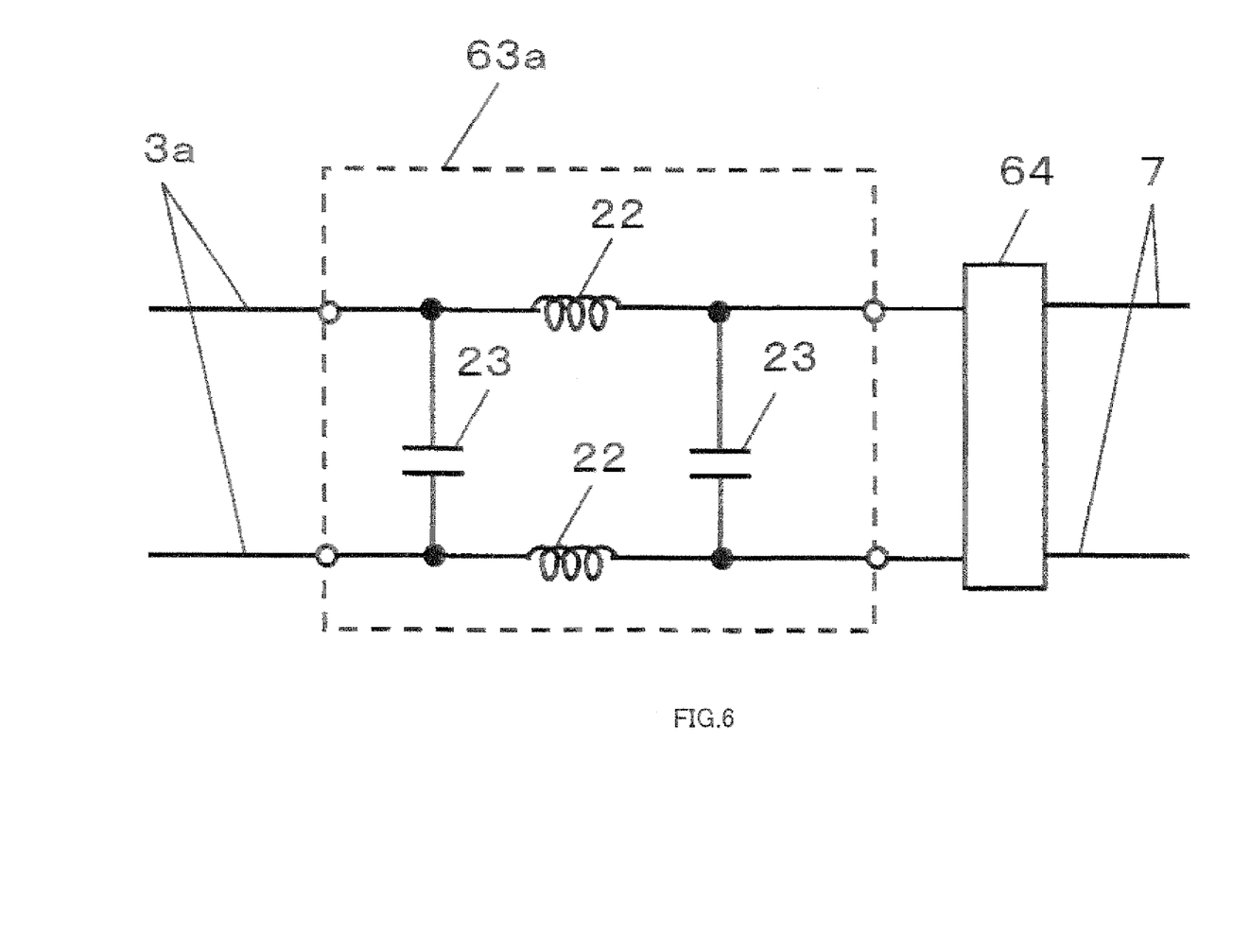
FIG. 6 is a block diagram showing another configuration example of a low-pass filter of a vehicle charging apparatus in a vehicle charging system.
Figure 7:
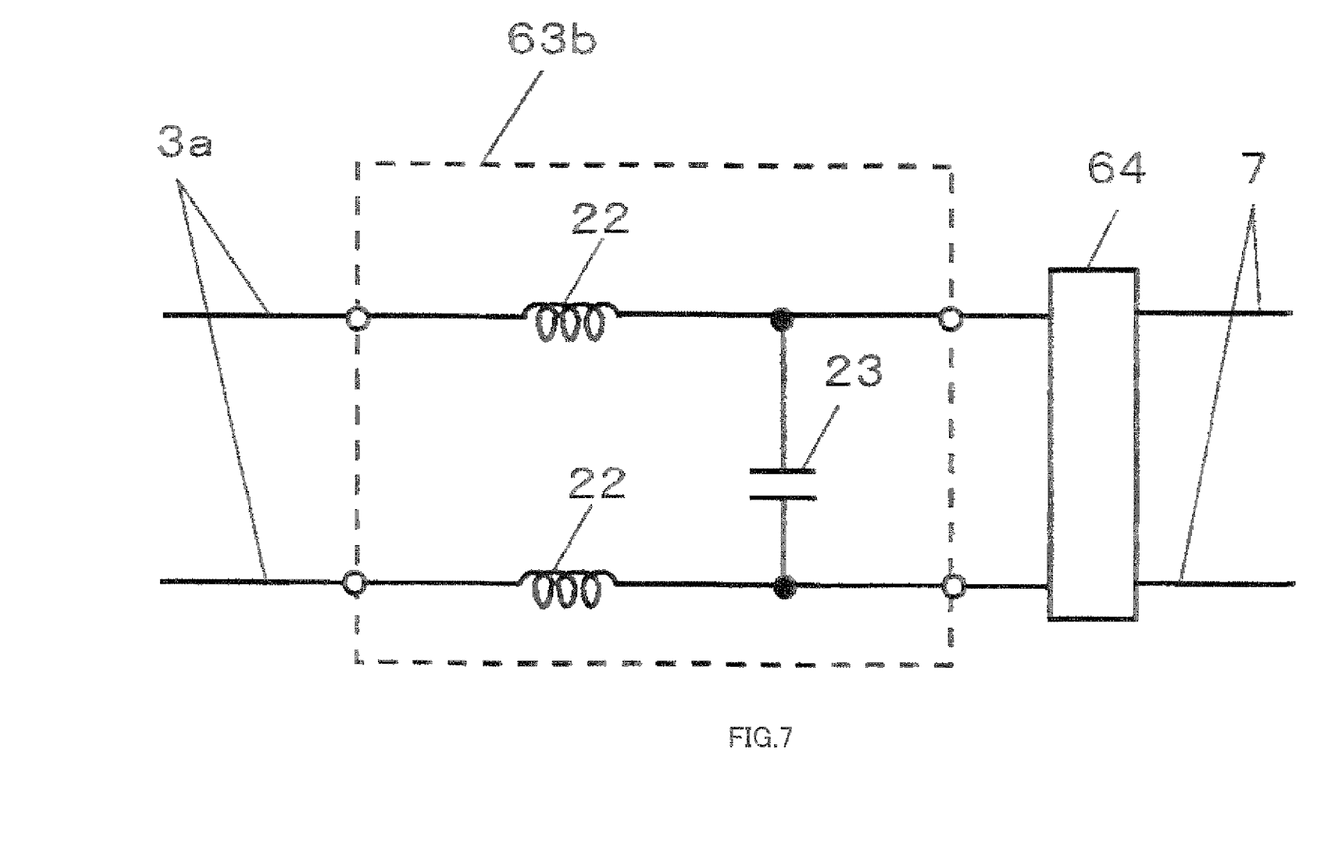
FIG. 7 is a block diagram showing yet another configuration example of a low-pass filter of a vehicle charging apparatus in a vehicle charging system.

FIG. 5 is a block diagram showing a configuration of low-pass filter 63 of vehicle charging apparatus 6 in vehicle charging system 1 according to this embodiment, FIG. 6 is a block diagram showing another configuration example of above low-pass filter 63, and FIG. 7 is a block diagram showing yet another configuration example of above low-pass filter 63.

As shown in FIG. 5, low-pass filter 63 comprises a T filter balance circuit using inductors 21, inductors 22, and capacitor 23. By this means, low-pass filter 63 attenuates a power line communication high-frequency signal superimposed on residential power line 3a output from charge command apparatus 5 and outputs this attenuated signal to vehicle power line 7 via connection section 64, enabling leakage of a power line communication high-frequency signal into space outside residence 2 to be impeded. Also, since a power line communication high-frequency signal superimposed on vehicle power line 7 output from vehicle 8 is also attenuated before being output to residential power line 3a by having low-pass filter 63 configured as a T filter, interference with, for example, low-speed power line carrier frequency communication used for some time as a home automation communication means can be reduced, and the introduction of high-frequency noise (for example, vehicle charging apparatus noise or the like) from outside residence 2 can be suppressed.

Low-pass filter 63 is not limited to a T filter, and a variety of variations are possible according to the input/output impedance. For example, the configurations shown in FIG. 6 and FIG. 7 may also be used. That is to say, a pi filter balance circuit configuration may be used as in the case of low-pass filter 63a shown in FIG. 6, or an L filter balance circuit configuration may be used as in the case of low-pass filter 63b shown in FIG. 7.

Through the use of any of these filters, a high-frequency signal superimposed on residential power line 3a is attenuated and is impeded from leaking outside residence 2.

Figure 8:
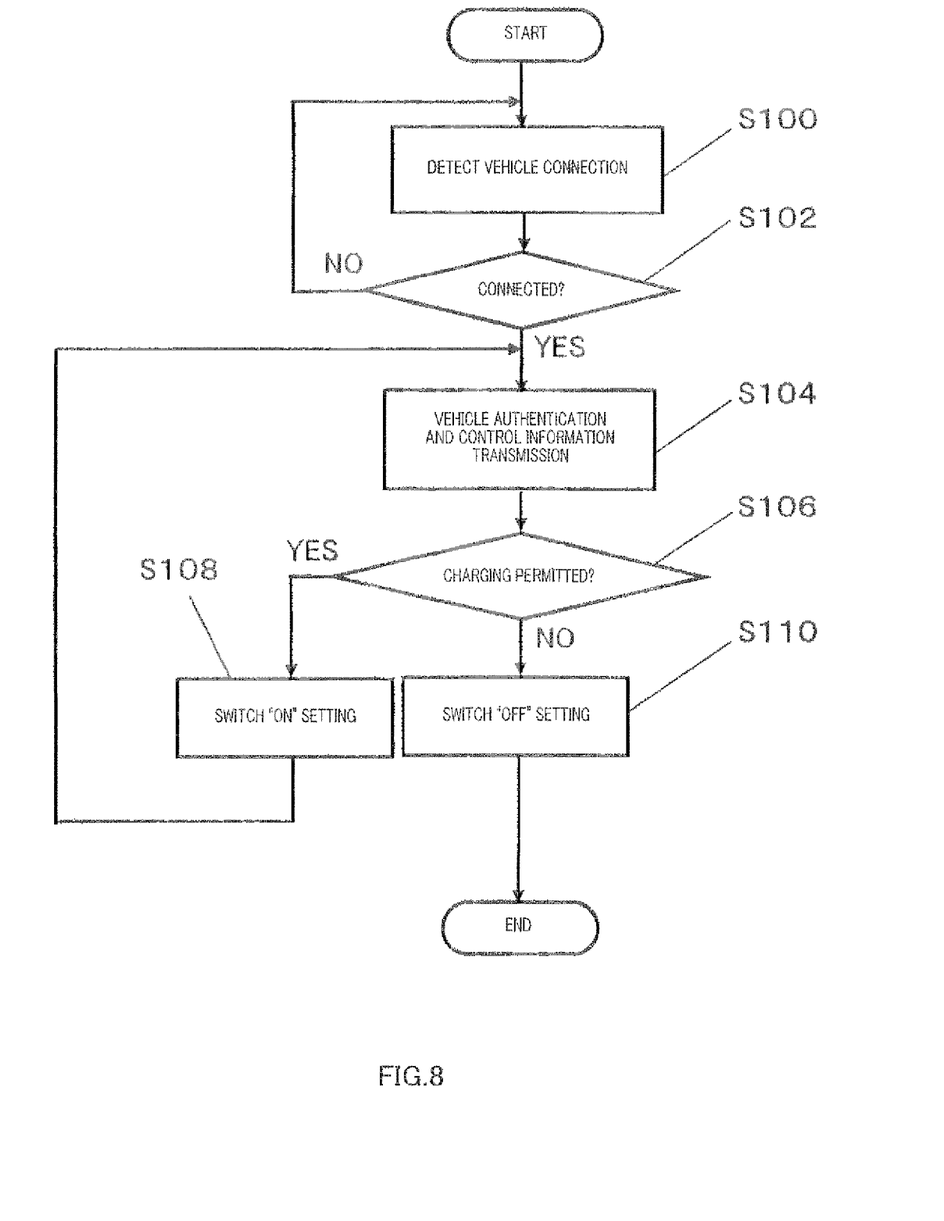
FIG. 8 is a flowchart explaining the operation of a vehicle charging system.

Next, the operation of vehicle charging system 1 will be described with reference to FIG. 1, FIG. 2, and FIG. 8. FIG. 8 is a flowchart explaining the operation of vehicle charging system 1 according to this embodiment.

First, in vehicle charging system 1, vehicle 8 connection is detected by vehicle power line 7 of vehicle charging apparatus 6 being inserted in power socket 9 of vehicle 8 (S100, S102).

Next, when connection of vehicle 8 is detected in vehicle charging system 1, charge command apparatus 5 and vehicle 8 perform an authentication operation. In vehicle charging system 1, control information is transmitted from charge command apparatus 5 to vehicle charging apparatus 6 based on the authentication result (S104).

In S104, vehicle charging apparatus 6 performs relay processing of authentication related information transferred between charge command apparatus 5 and vehicle 8 (a MAC address of power line communication section 4 of charge command apparatus 5 and a MAC address of a power line communication apparatus (not shown) of vehicle 8, or the like), and after completing authentication processing, performs reception processing of control information transmitted from charge command apparatus 5.

When control information is charging permission information, vehicle charging system 1 controls switch 64a of connection section 64 by means of vehicle charging apparatus 6 so as to be in a closed state (S106, S108). (S104) through (S108) are executed repeatedly until charging of vehicle 8 is completed.

On the other hand, if control information is charging non-permission information, vehicle charging system 1 controls switch 64a of connection section 64 so as to be in an open state (S106, S110). By this means, the power supply from vehicle charging apparatus 6 is stopped.

As described above, according to this embodiment, as shown in FIG. 1 and FIG. 2, vehicle charging apparatus 6 is disposed between residential power line 3a and vehicle power line 7, and is provided with low-pass filter 63 that attenuates a power line communication high-frequency signal, power line communication section 60 that is connected in parallel to low-pass filter 63, performs conversion to a signal of a frequency lower than that of a power line communication high-frequency signal superimposed on residential power line 3a from charge command apparatus 5, and communicates with vehicle 8 via vehicle power line 7 by means of the converted low-frequency signal, and control section 65 that controls connection or disconnection of connection section 64 based on a charge command apparatus 5 command signal demodulated by power line communication section 60.

By means of this configuration, vehicle charging apparatus 6 outputs a power line communication high-frequency signal output from charge command apparatus 5 and superimposed on residential power line 3a to vehicle power line 7 after being attenuated by low-pass filter 63 even when charge command apparatus 5 inside residence 2 performs power line communication with vehicle 8 via vehicle charging apparatus 6, enabling power line communication high-frequency signal leakage into space outside residence 2 to be impeded. Also, since power line communication section 60 performs conversion to a signal of a frequency lower than that of a power line communication high-frequency signal used inside residence 2 and communicates with vehicle 8 outside residence 2, power line communication signal leakage outside residence 2 can be impeded.

Also, since vehicle charging system 1 is provided with above-described vehicle charging apparatus 6 and charge command apparatus 5 that communicates with vehicle charging apparatus 6 via residential power line 3a, and vehicle charging apparatus 6 supplies power to vehicle 8 from residential power line 3a based on a charge command apparatus 5 command, power line communication signal leakage into space outside residence 2 can be impeded even when charge command apparatus 5 inside residence 2 performs power line communication with vehicle 8 via vehicle charging apparatus 6.

An actual configuration of the present invention is not limited to the above-described embodiment, and various variations and modifications may be possible without departing from the scope of the present invention.

For example, since it is an object of the present invention to prevent loss of communication quality between a vehicle charging apparatus and charge command apparatus and reduce power line communication signal radiation from a vehicle power line, a similar effect can be obtained by keeping a frequency modulated or demodulated by second power line communication section 62 at a frequency used for communication with a device inside residence 2 (for example, a frequency of 2 MHz to 30 MHz), making the transmission signal level of that transmission signal and a modulation section installed in the vehicle charging apparatus a low transmission signal level of wall attenuation 10 to 20 dB of a typical residence (for example, in the case of a frequency of 2 MHz to 30 MHz) or more, and making this a normal transmission level for the first power line communication section.

Also, an electric vehicle has been described as an example, but this embodiment is not limited to this, and can also be applied to a hybrid vehicle that uses both a motor and an engine.

Furthermore, in the above embodiment a description has been given of vehicle charging apparatus 6 that performs frequency conversion in power line communication executed between an indoor power line communication apparatus (charge command apparatus 5) and outdoor vehicle 8, but it is also possible for vehicle charging apparatus 6 to be applied to a case in which a power line that transmits a power line communication high-frequency signal (equivalent to residential power line 3a in the above embodiment) is disposed underground.

Moreover, in the above embodiment an example has been described in which a power line communication high-frequency signal is converted to a power line communication low-frequency signal, but conversion may also be performed to a radio communication low-frequency signal or a low-frequency signal for a dedicated communication line instead of a power line communication low-frequency signal.

If a power line communication high-frequency signal is converted to a radio communication low-frequency signal, a communication circuit or the like capable of performing radio communication should be used instead of the second power line communication section, and if a power line communication high-frequency signal is converted to a low-frequency signal for a dedicated communication line, a communication circuit supporting that dedicated communication line should be used.

Thus, a power supply apparatus described in the above embodiment performs supplying of power to a device having a second power line communication apparatus that performs communication with a first power line communication apparatus via a power line, and employs a configuration having: a receiving section that receives a first signal that is transmitted from the first power line communication apparatus and has a first frequency via the power line; a frequency conversion section that converts the first signal to a second signal having a second frequency lower than the first frequency; and a transmitting section that transmits the second signal to the second power line communication apparatus via the power line.

According to this configuration, by converting a first signal having a first frequency to a second signal having a frequency lower than that first frequency and transmitting this second signal to a device, signal leakage in power line communication between the first power line communication apparatus and the device can be reduced.

Also, a power supply apparatus described in the above embodiment employs a configuration whereby the first signal has control information relating to supplying of power performed by that power supply apparatus.

According to this configuration, by transmitting control information relating to supplying of power as a first signal, it is possible to control supplying of power performed by that power supply apparatus.

Also, a power supply apparatus described in the above embodiment employs a configuration whereby the first signal has information relating to authentication for authenticating the device.

According to this configuration, by transmitting information relating to authentication for authenticating the device as a first signal, it is possible to authenticate the device.

Also, a power supply apparatus described in the above embodiment employs a configuration further having: a connection section that places the power line in a disconnected state or a connected state; and a control section that controls the connection section based on at least one of the first signal and the second signal.

According to this configuration, by controlling the power line so as to be in a connected state or a disconnected state based on at least one of the first signal and the second signal, it is possible to control the power supply to a device.

Also, a power supply apparatus described in the above embodiment employs a configuration further having: a cutoff section that passes the power and cuts off the first signal; and a bypass section that bypasses the cutoff section and the connection section; wherein at least one of the receiving section, the frequency conversion section, and the transmitting section is disposed in the bypass section.

According to this configuration, the power line can transmit the first signal and the second signal even when the power line is in a disconnected state. That is to say, it is possible to perform supplying of power to a device and transmission of the first signal and second signal independently.

Also, a power supply apparatus described in the above embodiment employs a configuration wherein the cutoff section is a low-pass filter.

Also, a power supply apparatus described in the above embodiment employs a configuration wherein the low-pass filter is a T filter, a pi filter, or an L filter, composed of an inductor and a capacitor.

Also, a power supply apparatus described in the above embodiment employs a configuration whereby: the first power line communication apparatus stores charging permission information permitting charging of the device in the first signal when authentication for the device succeeds; and the control section controls the connection section so that the power line enters a connected state based on the charging permission information.

According to this configuration, since the connection section is controlled so that the power line enters a connected state based on charging permission information stored in the first signal, charging of the device can be performed only when device authentication succeeds, making it possible to prevent electricity theft and so forth.

Also, a power supply apparatus described in the above embodiment employs a configuration whereby: the first power line communication apparatus stores charging non-permission information that does not permit charging of the device in the first signal when authentication for the device fails; and the control section controls the connection section so that the power line enters a disconnected state based on the charging non-permission information.

According to this configuration, since the connection section is controlled so that the power line enters a disconnected state based on charging non-permission information stored in the first signal, charging of the device is not performed when device authentication fails, making it possible to prevent electricity theft and so forth.

Also, a power supply apparatus described in the above embodiment employs a configuration whereby: the first signal is a first multicarrier signal using a first frequency band; the second signal is a second multicarrier signal using a second frequency band narrower than the first frequency band; and the frequency conversion section does not perform conversion to the second multicarrier signal for the first multicarrier signal when the destination of a first multicarrier signal received by the receiving section differs from that power supply apparatus.

If a first multicarrier signal is converted to a second multicarrier signal when the destination of a first multicarrier signal received by the receiving section differs from that power supply apparatus, a second frequency band that is relatively narrower than the first frequency band is used needlessly. Thus, according to this configuration, the frequency conversion section does not perform conversion to a second multicarrier signal in this case, making it possible to utilize the second frequency band efficiently.

Also, a power supply apparatus described in the above embodiment employs a configuration whereby: the first signal is a first multicarrier signal using a first frequency band; the second signal is a second multicarrier signal using a second frequency band narrower than the first frequency band; and the frequency conversion section does not perform conversion to the second multicarrier signal for the first multicarrier signal when the destination of a first multicarrier signal received by the receiving section differs from the second power line communication apparatus.

If a first multicarrier signal is converted to a second multicarrier signal when the destination of the first multicarrier signal differs from the second power line communication apparatus, a second frequency band that is relatively narrower than the first frequency band is used needlessly. Thus, according to this configuration, the frequency conversion section does not perform conversion to a second multicarrier signal in this case, making it possible to utilize the second frequency band efficiently.

Also, a power supply apparatus described in the above embodiment employs a configuration having: one of the above-described power supply apparatuses; the first power line communication apparatus; and a vehicle having the second power line communication apparatus.

According to this configuration, power line communication signal leakage can be reduced in power line communication performed between a first power line communication apparatus and a vehicle at the time of authentication or during charging.

According to a power supply apparatus or vehicle charging system described in the above embodiment, a power line communication high-frequency signal superimposed on a residential power line output from a charge command apparatus is output to a vehicle power line after being attenuated by means of a low-pass filter, enabling power line communication high-frequency signal leakage outside the residence to be impeded. Also, the power line communication section performs conversion to a signal of a frequency lower than that of a power line communication high-frequency signal used inside a residence and communicates with a vehicle outside the residence, enabling power line communication signal leakage outside the residence to be impeded.

In addition, according to a power supply apparatus or vehicle charging system described in the above embodiment, power from a residential power line is supplied to a vehicle based on a charge command apparatus command, enabling power line communication signal leakage outside a residence to be impeded even when a charge command apparatus inside the residence performs power line communication with the vehicle via a vehicle charging apparatus.

INDUSTRIAL APPLICABILITY

In the above embodiment, a power line communication high-frequency signal that is output from a charge command apparatus and superimposed on a residential power line is output to a vehicle power line after being attenuated by means of a low-pass filter, enabling leakage of a power line communication high-frequency signal outside a residence to be impeded. Also, when communicating with a vehicle outside a residence, a power line communication section performs conversion to a signal of a frequency lower than that of a power line communication high-frequency signal used inside the residence, enabling power line communication signal leakage outside the residence to be impeded.

Thus, the present invention is suitable for use in a vehicle charging apparatus that supplies power to a vehicle such as an electric vehicle or hybrid vehicle that runs by charging an electrical storage apparatus with power and using that stored power to rotate the wheels, and a vehicle charging system that uses this.

REFERENCE SIGNS LIST

1 Vehicle charging system
2 Residence
3 Power source
3a Residential power line
4, 60 Power line communication section
5 Charge command apparatus
6 Vehicle charging apparatus
7 Vehicle power line
8 Vehicle
8a Vehicle body
9 Power socket
10 Electrical storage apparatus
11, 16, 23 Capacitor
12 First coupler
13 First modulation/demodulation section
14 First signal processing section
15 First dedicated communication section
17 Second coupler
18 Second modulation/demodulation section
19 Second signal processing section
20 Second dedicated communication section
21, 22 Inductor
61 First power line communication section
62 Second power line communication section 63, 63a, 63b Low-pass filter
64 Connection section
64a Switch
65 Control section
66 Dedicated data line

The invention claimed is:

1. A power supply apparatus that supplies power to a device having a second power line communication apparatus that communicates with a first power line communication apparatus via a power line, the power supply apparatus comprising:
- a receiver that receives, from the first power line communication apparatus via the power line, a first multicarrier signal using a first frequency band;
- a frequency converter which, in operation, converts the first multicarrier signal to a second multicarrier signal using a second frequency band lower and narrower than the first frequency band; and
- a transmitter that transmits the second signal to the second power line communication apparatus via the power line, wherein
- the frequency converter does not convert the first multicarrier signal to the second multicarrier signal when a destination of the first multicarrier signal received by the receiver differs from the power supply apparatus.

2. The power supply apparatus according to claim 1, wherein the first multicarrier signal has control information relating to supplying of power performed by the power supply apparatus.

3. The power supply apparatus according to claim 1, wherein the first multicarrier signal has information relating to authentication for authenticating the device.

4. The power supply apparatus according to claim 1, further comprising:
- a connector that places the power line in a disconnected state or a connected state; and
- a controller that controls the connector based on at least one of the first multicarrier signal and the second multicarrier signal.

5. The power supply apparatus according to claim 4, further comprising:
- a cutoff section that passes the power and cuts off the first multicarrier signal; and
- a bypass that bypasses the cutoff section and the connector, wherein at least one of the receiver, the frequency converter, and the transmitter is disposed in the bypass.

6. The power supply apparatus according to claim 5, wherein the cutoff section is a low-pass filter.

7. The power supply apparatus according to claim 6, wherein the low-pass filter is a T filter, a pi filter, or an L filter, composed of an inductor and a capacitor.

8. The power supply apparatus according to claim 4, wherein:
- the first power line communication apparatus stores charging permission information permitting charging of the device in the first multicarrier signal when authentication for the device succeeds; and
- the controller controls the connector so that the power line enters a connected state based on the charging permission information.

9. The power supply apparatus according to claim 4, wherein:
- the first power line communication apparatus stores charging non-permission information that does not permit charging of the device in the first signal when authentication for the device fails; and
- the controller controls the connector so that the power line enters a disconnected state based on the charging non-permission information.

10. A power supply apparatus that supplies power to a device having a second power line communication apparatus that communicates with a first power line communication apparatus via a power line, the power supply apparatus comprising:
- a receiver that receives, from the first power line communication apparatus via the power line, a first multicarrier signal using a first frequency band;
- a frequency converter which, in operation, converts the first multicarrier signal to a second multicarrier signal using a second frequency band lower and narrower than the first frequency band; and
- a transmitter that transmits the second signal to the second power line communication apparatus via the power line, wherein
- the frequency converter does not convert the first multicarrier signal to the second multicarrier signal when a destination of the first multicarrier signal received by the receiver differs from the second power line communication apparatus.

11. A vehicle charging system comprising:
- the power supply apparatus according to claim 1;
- the first power line communication apparatus; and
- a vehicle having the second power line communication apparatus.

12. The power supply apparatus according to claim 10, wherein the first multicarrier signal has control information relating to supplying of power performed by the power supply apparatus.

13. The power supply apparatus according to claim 10, wherein the first multicarrier signal has information relating to authentication for authenticating the device.

14. The power supply apparatus according to claim 10, further comprising:
- a connector that places the power line in a disconnected state or a connected state; and
- a controller that controls the connector based on at least one of the first multicarrier signal and the second multicarrier signal.

15. The power supply apparatus according to claim 14, further comprising:
- a cutoff section that passes the power and cuts off the first multicarrier signal; and
- a bypass that bypasses the cutoff section and the connector, wherein at least one of the receiver, the frequency converter, and the transmitter is disposed in the bypass.

16. The power supply apparatus according to claim 15, wherein the cutoff section is a low-pass filter.

17. The power supply apparatus according to claim 16, wherein the low-pass filter is a T filter, a pi filter, or an L filter, composed of an inductor and a capacitor.

18. The power supply apparatus according to claim 17, wherein:
- the first power line communication apparatus stores charging permission information permitting charging of the device in the first multicarrier signal when authentication for the device succeeds; and
- the controller controls the connector so that the power line enters a connected state based on the charging permission information.

19. The power supply apparatus according to claim 14, wherein:
- the first power line communication apparatus stores charging non-permission information that does not permit charging of the device in the first signal when authentication for the device fails; and the controller controls the connector so that the power line enters a disconnected state based on the charging non-permission information.

\* \* \* \* \*